(12) United States Patent
Brunzema et al.

(10) Patent No.: US 11,797,391 B2
(45) Date of Patent: Oct. 24, 2023

(54) CURRENT MONITORING IN HYPERSCALER ENVIRONMENT

(71) Applicant: SAP SE, Walldorf (DE)

(72) Inventors: Martin Brunzema, Berlin (DE);
Henrik Hempelmann, Havelberg (DE);
Benedikt Klus, Hamburg (DE); Stefan Voss, Potsdam (DE); Anne Roessiger, Berlin (DE)

(73) Assignee: SAP SE, Walldorf (DE)

( * ) Notice: Subject to any disclaimer, the term of this patent is extended or adjusted under 35 U.S.C. 154(b) by 134 days.

(21) Appl. No.: 16/870,338

(22) Filed: May 8, 2020

(65) Prior Publication Data
US 2021/0349786 A1   Nov. 11, 2021

(51) Int. Cl.
*G06F 16/23* (2019.01)
*G06F 11/14* (2006.01)

(52) U.S. Cl.
CPC ...... *G06F 11/1464* (2013.01); *G06F 16/2379* (2019.01); *G06F 2201/80* (2013.01)

(58) Field of Classification Search
CPC ............. G06F 11/1464; G06F 16/2379; G06F 2201/80
See application file for complete search history.

(56) References Cited

U.S. PATENT DOCUMENTS

| 10,778,543 | B2* | 9/2020 | Guan .................. | G06F 11/1464 |
| 2016/0378614 | A1* | 12/2016 | Thanasekaran ..... | G06F 11/1458 707/652 |
| 2019/0370142 | A1* | 12/2019 | Jonnala .............. | G06F 11/3051 |
| 2019/0377592 | A1* | 12/2019 | Verma ................. | G06F 9/45558 |
| 2020/0026620 | A1* | 1/2020 | Skowronski ........ | G06F 11/1458 |
| 2020/0110640 | A1* | 4/2020 | Asthana ............... | G06N 20/00 |

* cited by examiner

*Primary Examiner* — Ken Hoang
(74) *Attorney, Agent, or Firm* — Buckley, Maschoff & Talwalkar LLC

(57) ABSTRACT

A system and method providing monitoring of services hosted by a hyperscaler environment. The method including receiving an indication of at least one metric related to a backup storage process for each of a plurality of hyperscaler hosted database service instances; determining at least one value for each of the plurality of database service instances; storing a record of the determined at least one value for each of the plurality of database service instances in a persistent data storage device that is distinct and separate from the database service instances; receiving a request from a third-party entity for the stored at least one value for at least one of the plurality of database service instances; and transmitting the requested one or more of the at least one value for the database service instances specified in the request.

17 Claims, 8 Drawing Sheets

400

```
┌─────────────────────────────────────────────────────────┐
│ RECEIVE AN INDICATION OF AT LEAST ONE METRIC RELATED    │
│ TO A BACKUP STORAGE PROCESS FOR EACH OF A PLURALITY OF  │
│ DATABASE SERVICE INSTANCES HOSTED BY A CLOUD SERVICES   │
│ INFRASTRUCTURE PROVIDING BACKUP STORAGE SPACE FOR THE   │
│ PLURALITY OF DATABASE SERVICE INSTANCES                 │
│                                                     405 │
└─────────────────────────────────────────────────────────┘
                             │
                             ▼
┌─────────────────────────────────────────────────────────┐
│ DETERMINE, BASED ON THE RECEIVED INDICATION OF THE AT   │
│ LEAST ONE METRIC FOR EACH OF THE PLURALITY DATABASE     │
│ SERVICE INSTANCES, AT LEAST ONE VALUE FOR EACH OF THE   │
│ PLURALITY OF DATABASE SERVICE INSTANCES                 │
│                                                     410 │
└─────────────────────────────────────────────────────────┘
                             │
                             ▼
┌─────────────────────────────────────────────────────────┐
│ STORE A RECORD OF THE DETERMINED AT LEAST ONE VALUE FOR │
│ EACH OF THE PLURALITY OF DATABASE SERVICE INSTANCES IN  │
│ A PERSISTENT DATA STORAGE DEVICE THAT IS DISTINCT AND   │
│ SEPARATE FROM THE CLOUD SERVICES INFRASTRUCTURE         │
│                                                     415 │
└─────────────────────────────────────────────────────────┘
                             │
                             ▼
┌─────────────────────────────────────────────────────────┐
│ RECEIVE A REQUEST FROM A THIRD-PARTY ENTITY FOR ONE OR  │
│ MORE OF THE STORED AT LEAST ONE VALUE FOR AT LEAST      │
│ ONE OF THE PLURALITY OF DATABASE SERVICE INSTANCES      │
│                                                     420 │
└─────────────────────────────────────────────────────────┘
                             │
                             ▼
┌─────────────────────────────────────────────────────────┐
│ TRANSMIT, IN REPLY TO THE REQUEST FROM THE THIRD-PARTY  │
│ ENTITY, THE REQUESTED ONE OR MORE OF THE AT LEAST ONE   │
│ VALUE FOR THE DATABASE SERVICE INSTANCES SPECIFIED      │
│ IN THE REQUEST                                          │
│                                                     425 │
└─────────────────────────────────────────────────────────┘
```

*FIG. 4*

| Database Service ID | Age Last Data Backup (In Seconds) | Age Last Log Backup (In Seconds) | Determined On |
|---|---|---|---|
| Database Service A | 21600 | 480 | 2020-01-13 02:00:00 |
| Database Service B | 32400 | 120 | 2020-01-13 06:40:00 |
| Database Service C | 432000 | 43200 | 2020-01-13 03:30:00 |

*FIG. 6*

| Database Service ID | Backup Name | Backup Status | Backup Created On |
|---|---|---|---|
| Database Service A | Daily Data Backup | successful | 2020-01-13 07:00:00 |
| Database Service B | Daily Data Backup | successful | 2020-01-13 03:00:00 |
| Database Service C | Daily Data Backup | successful | 2020-01-13 11:00:00 |
| Database Service A | Daily Data Backup | successful | 2020-01-14 07:00:00 |
| Database Service B | Daily Data Backup | successful | 2020-01-14 03:00:00 |
| Database Service C | Daily Data Backup | failed | 2020-01-14 11:00:00 |
| Database Service A | Daily Data Backup | successful | 2020-01-15 07:00:00 |
| Database Service B | Daily Data Backup | successful | 2020-01-15 03:00:00 |
| Database Service C | Daily Data Backup | successful | 2020-01-15 11:00:00 |

*FIG. 7*

CURRENT MONITORING IN HYPERSCALER ENVIRONMENT

BACKGROUND

Many modern computing deployments generate extraordinarily large amounts of data. The storage of this data consumes a tremendous amount of storage and compute resources. The costs and time for an organization to build out the infrastructure to support their present and future storage and compute needs might very well exceed their abilities and/or capabilities. This is particularly true as more and more systems revolve around cloud services.

A number of large cloud infrastructure and service providers have emerged and continue to come into existence that may provide the infrastructure to support customers in need of robust and reliable storage and compute needs. A benefit offered by these providers is that their systems are scalable, responsive to their customers' needs. These large cloud infrastructure and service providers may provide an incredibly large amount of storage that can be used to accommodate the customers individually and aggregately, scaling up and out as need be to accommodate increasing storage and processing requirements. In some regards, backup of an organization's data system(s) is vitally important to the operation of an enterprise, in case of system outages and other customer critical situations involving potential data loss and/or data inconsistencies. Large cloud infrastructure and service providers might provide a remote storage location for customer data backups, while also offering improved resilience and availability of the backups. In some regards, it may be vital to know the status or performance of hosted services. The monitoring of such services, if at all, has typically been a function of the service themselves. An unfortunate consequence of this type of configuration is that the monitoring aspects are dependent on the service itself being available and online.

Large cloud infrastructure and service providers may host services and storage for hundreds of thousands or even millions of customers. However, there exists a need for accurate monitoring and reporting of the performance of hosted services of each of the customers of a large cloud infrastructure and service provider environment.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 4 is an illustrative flow diagram of a backup storage monitoring process, in accordance with an example embodiment.

FIG. 6 is an illustrative representation of a database related to a hyperscaler monitoring service herein, in accordance with an example embodiment.

FIG. 7 is an illustrative representation of another database related to a hyperscaler monitoring service herein, in accordance with an example embodiment.

Figure 1:
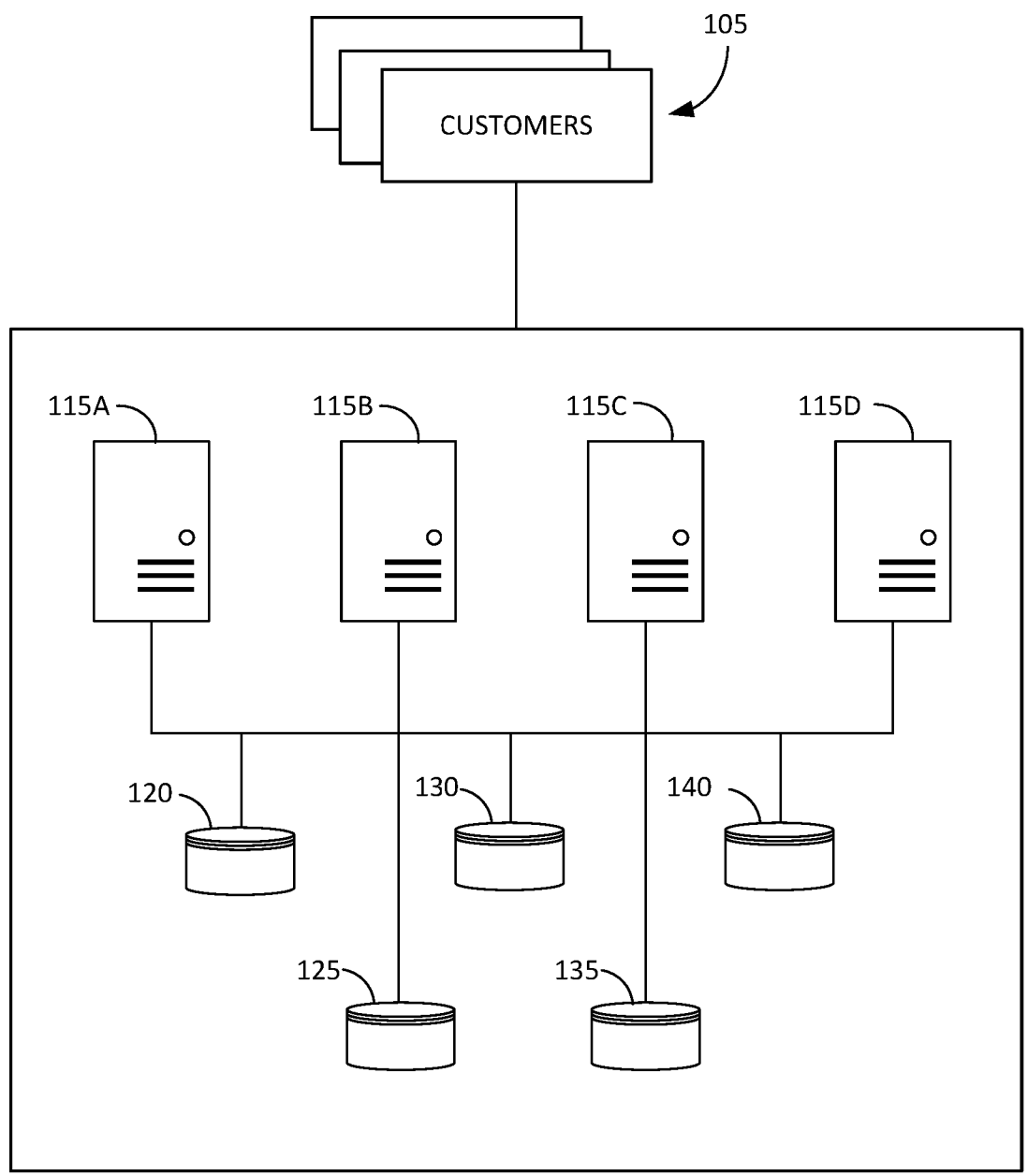
FIG. 1 is a diagram illustrating an architecture for a cloud infrastructure and service provider, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the present disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

As used herein, the term "hyperscaler" refers to a company or other entity that provides, for example, public cloud and cloud service industries, although other services and businesses might also be provided. Hyperscalers provide cloud storage and compute infrastructures on a scale (i.e., size and extent) that far exceeds that of typical data centers. Hyperscalers may provide, maintain, and upgrade the infrastructure, including hardware, (customized) software, facilities, power management systems, etc. to provide services to customers with improved uptime. While Hyperscalers might provide a number of different services to end users (e.g. customers), aspects related to the data storage processes provided by a hyperscalers are, in some embodiments, significant to the present disclosure.

FIG. 1 is a high level illustrative depiction of a hyperscaler architecture 100, in accordance with an embodiment herein. Hyperscaler 110 includes all of the hardware, software, networks, facilities, energy management systems, and other operational aspects, whether custom or commodity acquisitions, to enable and support large cloud infrastructure and services for large numbers of users 105 (e.g., millions of customers of hosted services). All of these different aspects of the hyperscaler are not shown in FIG. 1. FIG. 1 includes illustrative representations of the many (e.g., >100,000) servers and storage devices implemented by the example hyperscaler that support the massive storage and compute capabilities of the its cloud infrastructure. Shown are servers 115A, 115B, 115C, and 115D that are networked to each other and to data storage devices/systems 120, 125, 130, 135, and 140. The servers and data storage devices depicted in FIG. 1 may include redundancies of some or all of each other to provide, in conjunction with certain executable processes, the reliability and resiliency of the hyperscaler environment 100. Additionally, FIG. 1 is an illustrative, figurative representation of hyperscaler servers and data storage devices/systems, as opposed to an actual physical or logical configuration thereof. In some aspects, the features of monitoring customer specific data backup and related process disclosed herein are not limited to any particular configuration or implementation of a hyperscaler.

Hyperscaler 100 may host a database for one or more of customers 105 in the cloud provided by its cloud infrastructure, where the database is provided as a service to the clients (i.e., Database-as-a-Service, DBaaS). In some aspects, the database offered by hyperscaler 100 stores backups for database service instances in an object storage where the backups (i.e., data) are stored as distinct "objects". Referring to the example of FIG. 1, the object storage may be provided and maintained by the storage devices/systems 120, 125, 130, 135, and 140, in part and/or different combinations. In some aspects, other processes related to a backup process, such as, but not limited to, data recovery processes may also be supported and provided by the hyperscaler.

Figure 2:
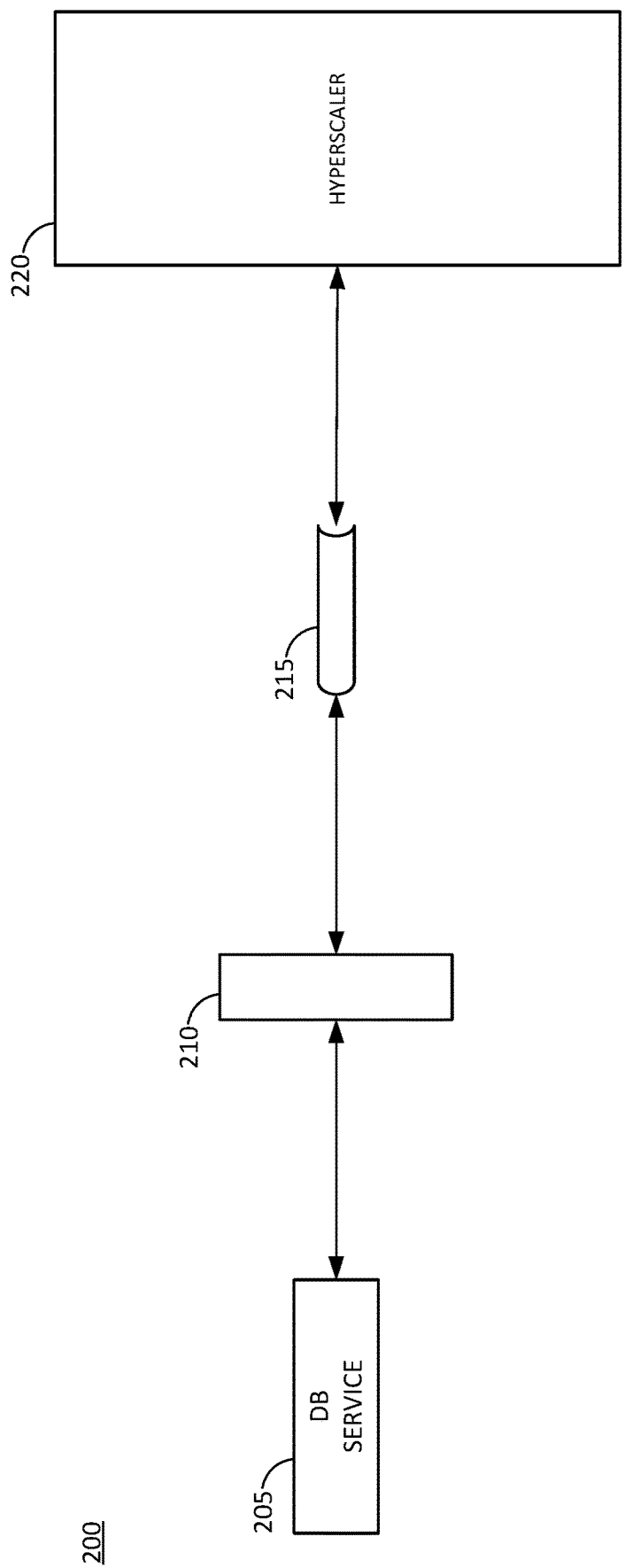
FIG. 2 is a block diagram illustrating some aspects of a data interface, in accordance with an example embodiment.

In some aspects, a database service instance might not know where or how its backups are actually stored. The database service instance may know that it makes a request to have a backup stored and might receive a confirmation or other indication that the backup is saved, but where the backup is actually stored can be beyond the scope of the database service instance. FIG. 2 is an illustrative depiction of some aspects of an architecture related to the storage of a backup for a database (or other) service instance in a hyperscaler environment, in some example embodiments. Database service instance 205 may store some data locally in, for example, an on-promise data store (not shown) or in an object store of hyperscaler 220. Database service instance 205 may connect to hyperscaler 220 via a backend interface 210 and data "pipe" 215 to write the backup directly to the cloud storage of the hyperscaler. In some aspects, backend interface is an abstract interface of architecture 200 and decouples the database service instance from hyperscaler 220 such that database service instance 205 has no knowledge or awareness of the actual storage location and mechanisms (e.g., data compression schemes, incremental, delta, etc.) used to store its data in the hyperscaler environment. Thus, in some embodiments, a database service instance might know how many bytes of data are sent to the hyperscaler from its perspective or side but does not know how much storage space is actually consumed or other related details on the cloud storage provider (i.e., hyperscaler) side since one or more different processes may be used by the cloud storage provider. The mechanisms or processes that occur behind the interface, including how the backup is processed and transferred to the cloud service, are not known by the database service instance. In some instances, the database service instance might not know to which cloud service provider the backup is transferred.

Figure 3:
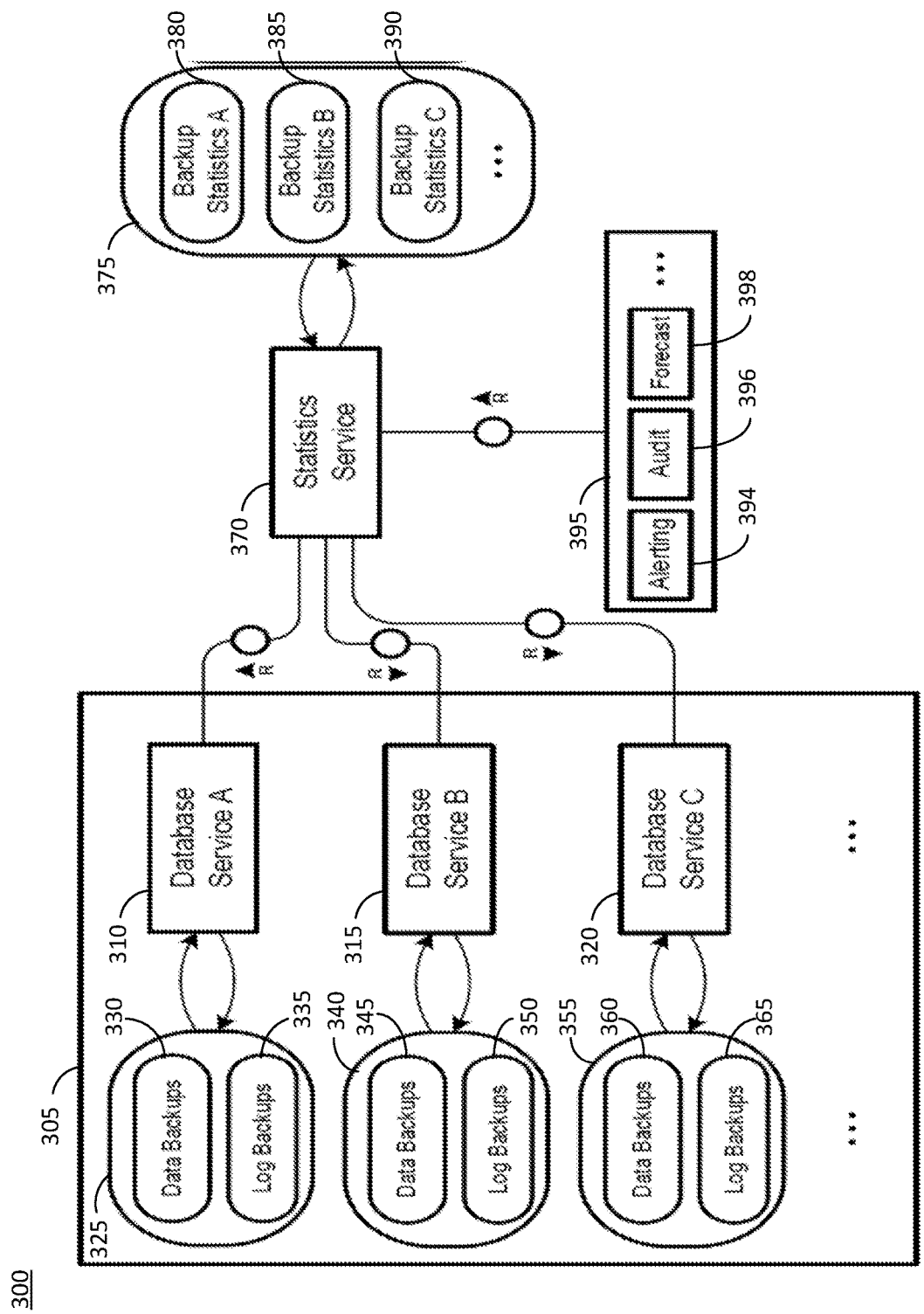
FIG. 3 is a block diagram of an architecture of a hyperscaler monitoring system, in accordance with an example embodiment.

FIG. 3 is a block diagram of an architecture or framework 300 including a customer specific monitoring system, in accordance with an example embodiment. Architecture or framework 300 includes a hyperscaler environment 305 that hosts a number of database services for a plurality of different customers/users. In the example of FIG. 3, the database service instances supported by the hyperscaler include, for illustrative purposes, database service instances "Database Service A" 310, "Database Service B" 315, and "Database Service C" 320. In some embodiments, each of the database service instances writes backups to a cloud storage (e.g., object storage) of hyperscaler 305. The backups of the database service instances may comprise different aspects or components, including, in some embodiments, a data backup portion and a log backup portion including details regarding the backup process of a respective backup. In the example of FIG. 3, backups 325 for database service instance 310 are written to hyperscaler storage and comprises data backups 330 and log backups 335, backups 340 for database service instance 315 are written to object storage of the hyperscaler and include data backups 345 and log backups 350, and backups 355 of database service instance 320 are written to the hyperscaler's object storage as data backups 360 and log backups 365.

In some aspects, hyperscaler 305 includes many more database service instances for storing corresponding backups than the few examples depicted in FIG. 3. In some other aspects, the particular configuration or representation of a backup or other data structure stored by the object storage of hyperscaler 305 for a database (or other) service instance herein might vary from the particular backup configurations including data backups and log backups shown in FIG. 3, where other configurations may include, fewer, more, substitute, or alternative components.

In some embodiments, a service 370 is provided that interfaces with hyperscaler environment 305 to monitor or otherwise gather indications or representations of one or more metrics related to the storage of backups stored in the cloud storage of hyperscaler environment 305. In some embodiments, backup processes and other processes related thereto, such as, for example, data recovery processes may be monitored. In some aspects, the one or more metrics related to the storage of backups may be processed, analyzed, or otherwise used by service 370 to determine one or more values for each of the different database service instances 310, 315, and 320. In some embodiments, the one or more metrics gathered or retrieved from hyperscaler 305 relate to an aspect of the database (or other) service instances hosted by the hyperscaler environment. Note that the one or more metrics gathered regarding each of the database (or other) service instances includes relevant information or data associated with each database (or other) service instance. The particular information or data included in the monitored and indications of the one or more metrics may be predetermined and relate to a specific use thereof by service 370 or another service.

In some aspects, the service 370 processes the one or more gathered metrics related to the database (or other) service instances to accurately determine one or more values of interest regarding the database (or other) service instances provided by the hyperscaler. In some embodiments, service 370 may be referred to as a statistics service since it may review, analyze, and determine the one or more values based on the gathered one or more metrics related to each of the database (or other) service instances. In some embodiments, the particular one or more values of interest determined regarding the database (or other) service instances might relate to a specific use thereof by service 370 or another service. That is, the particular values of interest determined by service 370 may be a function of how the values regarding the database (or other) service instances might be used (i.e., the purpose of a request). For example, service 370 may collect only the data relevant or needed to determine the statistics it is tasked to determined. In this manner, extraneous data need not be collected, thereby conserving resources.

In some embodiments, statistics service 370 may continuously gather the one or more metrics data related to the database (or other) service instances provided by the hyperscaler. The frequency of the data gathering of monitored processes may be predetermined to be, for example, every four hours, every 12 hours, every 24 hours, etc. The particular time period may be set by an administrative (or other) entity. In some instances, the time period may be based, at least in part, the type of service writing the backups, the customer of the provided service, the efficiency and/or other operational constraints of the hyperscaler provider of hyperscaler environment 305, and other factors, alone or in combination with one or more other factors. In some aspects, the continuous gathering of metrics related to the stored backups provides an indication of a current (i.e., latest) status of the monitored aspects of the database (or other) service instances provided by the hyperscaler. Based on the continuous gathering of the one or more metrics related to the storage of backups (e.g., objects) for each database service instance, statistics or monitoring service 370 may operate to determine values for each database service instance for any time period for which the monitoring service performs the functions disclosed herein.

In some embodiments, the monitoring and gathering or otherwise retrieval of the one or more metrics is facilitated by, for example, using an application programming interface (API) offered by the hyperscaler 305. The provided API can facilitate and support communications between the hyperscaler and statistics service 370.

In some aspects and embodiments, the collected information and data determined based thereon by service 370 is stored in a persistent memory system or device 375. Note that, in some embodiments, persistence 375 is separate and distinct from the hyperscaler 305. In some embodiments, persistence 375 includes a representation of backup statistics (i.e., values) determined for each of the database (or other) service instances hosted by the hyperscaler. In the example of FIG. 3, persistence 375 includes a record or other data structure including representation(s) of statistics for backup processes for database service instance 310 at 380, the statistics for backup processes for database service instance 315 at 385, and the statistics for backup processes for database service instance 320 at 390. In some aspects, persistence 375 might include a record or other data structure representation(s) of the statics determined by service 370 for backup processes for all of the database (or other) service instances hosted by the hyperscaler.

In some embodiments, the statistical data stored in persistence 375 may be provided to an entity independently of hyperscaler 305. Since service 370 and persistence 375 are external to and distinct and separate from hyperscaler 305, the statistical data determined by monitoring service 370 and stored in persistence 375 may include the latest status of a database (or other) service instance to an entity, whether the database (or other) service instances themselves are available (e.g., online) or not.

In some aspects, one or more third-party services may periodically and/or selectively make a request against monitoring service 370 for the record or other data structure representations including the values and statistics continuously determined (based on analysis of the collected metrics data) for a particular one or more of the database service instances. The third-party entity or services are collectively depicted at 395. In some instances, the values and statistics or data determined for each database service may be retrieved by the monitoring service 370 from its persistence and provided to services 395 in reply to a request for such information or data by one or more of the requesting services. In some instances, implementations of services 395 may include a third-party service or application (i.e., neither of the hyperscaler 305 or monitoring service 370).

In the example of FIG. 3, services 395 include, as non-exhaustive examples, an alerting service 194, an audit service 196, and a forecasting service 198, although additional, alternative, and fewer services might be included in some embodiments. Alerting service 194 might request statistical data from monitoring service 370 for the purpose of, for example, generating alerts if the statistical data indicates a database (or other) service instance associated with the statistical data exhibits a status considered unusual or dangerous based on predetermined criteria/rules (e.g., a backup has not been performed in the last 72 hours, missing backups, etc.). Audit service 194 might request statistical data from monitoring service 370 for the purpose of, for example, performing an audit of the backup processes for a database (or other) service instance to determine whether the backup processes are performed in compliance with relevant regulations, standards, practices, and certification processes. Forecast service 196 might request statistical data from monitoring service 370 for the purpose of, for example, generating forward-looking forecasts regarding different aspects of the database (or other) service instances including, for example, future maintenance needs, resource availability, etc. These and other types of services, alone and in combination, may send requests to monitoring service 370, requesting statistical or other data collected and/or determined by the monitoring service. The requesting services may use the data returned in reply to their requests from the monitoring service to, for example, provide a service to hyperscaler 305, one or more of the customers of the database (or other) service instances 310, 315, and 320, and other entities (potential customers of the requesting services).

In some embodiments, monitoring service 370 may use different processes and techniques in analyzing and determining the statistics (e.g., backup and other statistics) that are stored at 375. In some embodiments, log parts, different index traces, and different indexing schemes (e.g., indexing based on metadata, not the content of data itself, etc.) might be used by monitoring service 370 in an effort to store data relevant to the different services 395 in an efficient and reliable manner that can be provide on-demand (e.g., in reply to a request) concerning a latest status of a database (or other) service instance in the needed context for a given time frame (e.g., as specified in a request).

In some embodiments, the data or information collected and the statistics or values determined based on the collected information may be the same for all of the database (or other) serve instances in a hyperscaler environment for which information is collected. In some such embodiments, the statistics or values can be made available on-demand when requested for any or all of the of the database (or other) service instances.

In some embodiments, statistical (i.e., monitoring) service 370 might be a relatively "lightweight" service that primarily monitors hyperscaler services, collects metrics, and stores them on its own persistence. Additional processing and actions may be performed by third-party entities (e.g., services 395). In some aspects, the collection of data and other relevant information regarding the database (or other) service instances hosted by the hyperscaler environment herein is decoupled from the database service by the systems and methods of the present disclosure. In some embodiments, the statistical or monitoring service herein (e.g., 370) may be a dedicated, isolated, and highly scalable service.

In some embodiments, from a security perspective, a statistical or monitoring service herein may be a single source of truth for the latest status of backup and related processes of database service instances of a hyperscaler, even in an instance the plurality of database service instances are offline or otherwise unavailable.

FIG. 4 is an illustrative flow diagram of a hyperscaler service monitoring process 400, in accordance with an example embodiment. In some aspects, process 400 may be executed, at least in part and some instances, by a system disclosed herein including aspects of an architecture and hyperscaler environment such as, but not limited to, for example, FIG. 3. At operation 405, an indication of at least one metric related to a backup storage process for each of a plurality of database service instances is received. Referring to FIG. 3, the indication of the at least one metric may be received by statistics service 370. Moreover, the at least one metric may be received by statistics service 370 from hyperscaler 305 in reply to a request for such information and data from the statistics service. In some aspects, the request from statistics service 370 and the reply transmitted to statistics service 370 may be accomplished, in part, by an API offered by the hyperscaler environment. The request may be configured to gather a current status of a backup process (and related aspects) for each of the one or more database (or other) service instances hosted in a hyperscaler environment.

Operation 410 includes determining, in response to and based on the indication of the at least one metric received at operation 405 for each of the plurality of database (or other) service instances hosted by the hyperscaler environment, a current (i.e., latest) at least one metric related to a backup storage process for the plurality of database (or other) service instances.

Advancing to operation 415, a record or other data structure representation is persisted in a storage associated with a monitoring (or other) service initiating or otherwise managing the request that prompted the retrieval or gathering of the at least one metric related to a backup storage process for the plurality of database (or other) service instances at operation 405. The records stored at operation 415 relates to all of the database (or other) service instances referenced in operation 410. The stored records include one or more values determined by a monitoring service (e.g., FIG. 3, statistics service 370) for each of the database (or other) service instances referenced in operation 410.

Operation 420 includes receiving a request from a third-party entity (e.g., FIG. 3, services 395) for one or more of the values stored in the records of operation 415. The request may be from one or more third-party entities (e.g., a service, an application, a system, a device, etc.), alone or in combination. The request might specify one or more statistical or determined values for one or more of the plurality of database (or other) service instances. For example, a request might specify a first value for all of the database (or other) service instances hosted by a hyperscaler and a second value for the particular database (or other) service instances for which the first value exceeded a certain threshold.

At operation 420, the statistical service responds to the request of operation 415 by providing a reply that answers or otherwise fulfills the request. In an instance the service cannot provide the requested information (e.g., value(s) or statistics, etc.), the service may send a message to inform the requesting third-party as much. In some embodiments, communications between the third-party entities and the statistical (or other) service herein may be supported and facilitated by an API offered by the statistical (or other) service.

Figure 5:
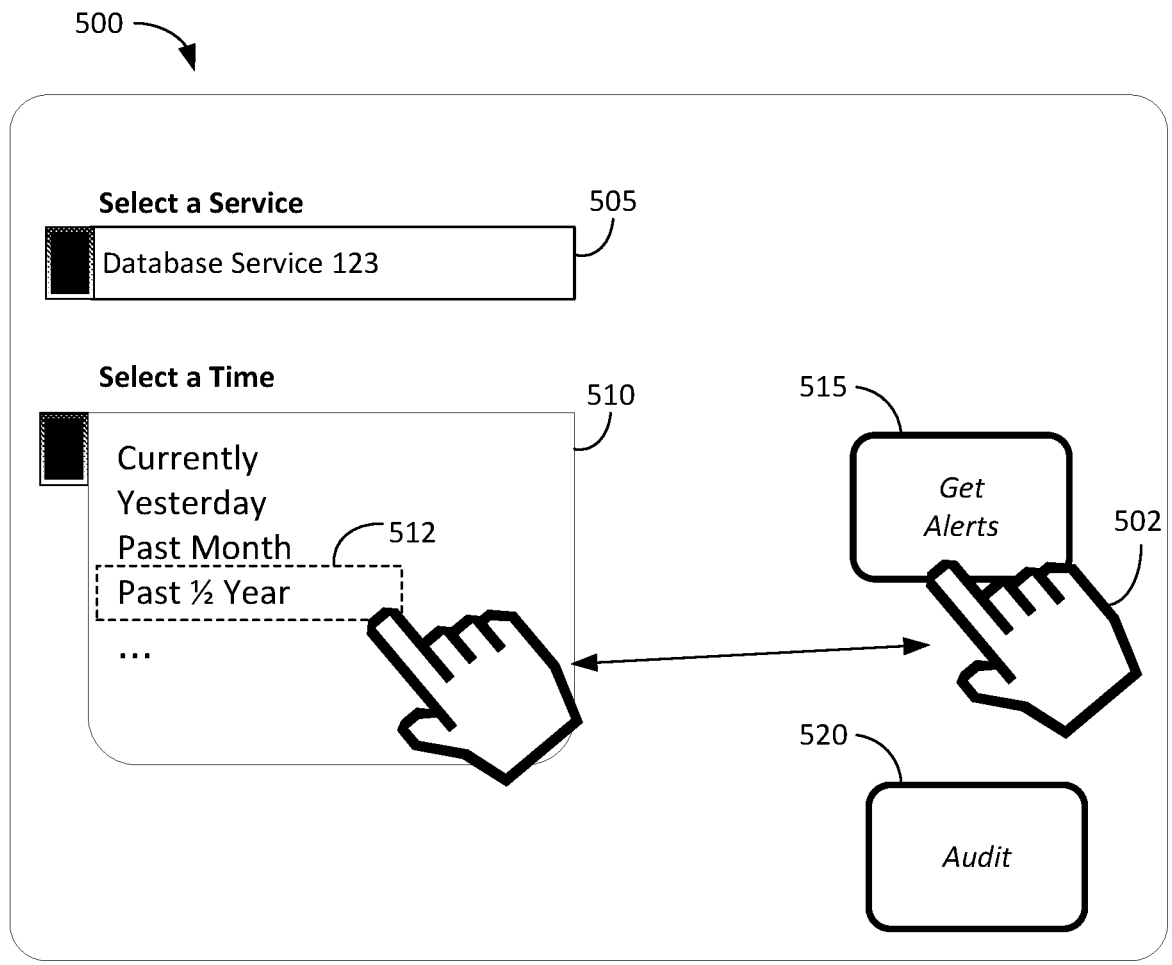
FIG. 5 is an illustrative representation of a user interface related to a hyperscaler monitoring service herein, in accordance with an example embodiment.

FIG. 5 is an illustrative diagram of an outward facing user interface (UI) 500 related to a system and process of monitoring hyperscaler services, in accordance with an example embodiment. UI 500 may be displayed within a display device associated with a monitoring (statistics or other) service or a display device independent of the monitoring (statistics or other) service (e.g., a display of a device or system in communication with monitoring (or other) service over a network via a browser application). Selection of one or more UI elements (e.g., icons, buttons, drop-down menu options, etc.) by a touchscreen input, computer pointer 502, etc. may result in the initiation or continuance of a use of the information monitored and stored by a monitoring service herein. For example, a user might selectively initiate a process to have the alerts (if any) assembled in a report (e.g., the selection of "Get Alerts" button 515) or the initiation or continuance of the determination of an audit for one or more of the database service instances of a hyperscaler (e.g., the selection of "Audit" button 520). In the example of FIG. 5, UI 500 includes a UI element 505 for selecting a service (e.g., a particular database (or other) service instance) for which certain information is desired by a particular third-party service (e.g., an alerting service, an auditing service, etc.). Additionally, UI 500 includes a drop-down menu 510 that may facilitate selection and entry of a particular time period of interest for which a report (e.g., alerts over the last 6 months, 512) is to be generated.

FIG. 6 is an illustrative representation of a database related to a monitoring system and process herein, in accordance with an example embodiment. A table 600 is shown that represents backup statistics collected from database service instances and stored by a monitoring service for an Alerting entity, according to some embodiments. The table may include, for example, entries detailing database services hosted by a hyperscaler. For example, table 600 defines field 605 for a database service ID that uniquely identifies each database service within the particular hyperscaler environment, an age of the last data backup 610, an age of the last log backup 615, and the time this data was collected at 620. Entries in database table 600 may be generated in response to the execution of the one or processes disclosed herein.

FIG. 7 is another illustrative representation of a database related to a monitoring system and process herein, in accordance with an example embodiment. Table 700 represents backup statistics collected from database service instances in a hyperscaler environment and stored by a monitoring service for an Audit entity, according to some embodiments. The table may include entries detailing aspects of the database services hosted by a hyperscaler. For example, table 700 defines field 705 for a database service ID that uniquely identifies each database service within the particular hyperscaler environment, a name for the backup that may further indicate a type of backup (e.g., daily, weekly, monthly, etc.) 710, a backup status 715 for the backup, and the time the backup was created at 720. Entries in database table 700 may be generated in response to the execution of the one or processes disclosed herein.

Figure 8:
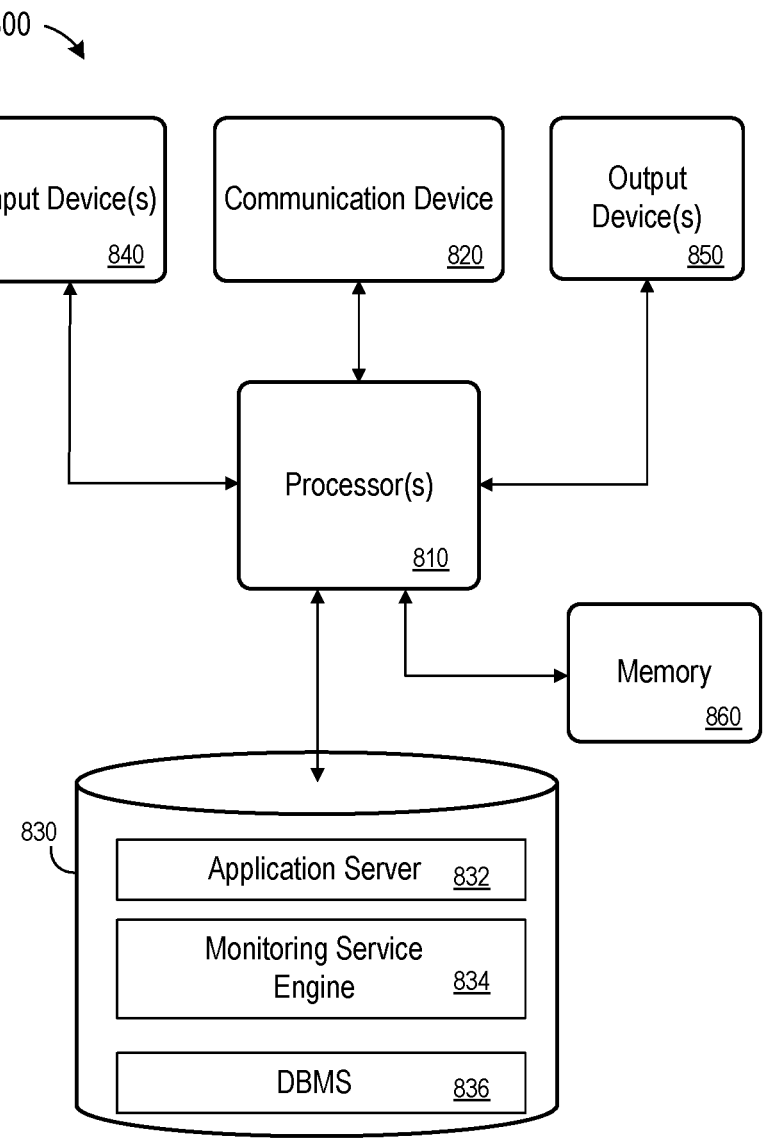
FIG. 8 is an illustrative block diagram of a computing system, in accordance with an example embodiment.

FIG. 8 illustrates a computing system 800 that may be used in any of the architectures or frameworks (e.g., FIGS. 2, 3) and processes (e.g., FIG. 4) described herein, in accordance with an example embodiment. FIG. 8 is a block diagram of server node 800 embodying a central monitoring service, according to some embodiments. Server node 800 may comprise a general-purpose computing apparatus and may execute program code to perform any of the functions described herein. Server node 800 may comprise an implementation of at least some features of architecture 200 of FIG. 2 in some embodiments. Server node 800 may include other unshown elements according to some embodiments.

Server node 800 includes processing unit(s) 810 operatively coupled to communication device 820, data storage device 830, one or more input devices 840, one or more output devices 850, and memory 860. Communication device 820 may facilitate communication with external devices, such as an external network or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Application server 832 may each comprise program code executed by processor(s) 810 to cause server 800 to perform any one or more of the processes described herein. Monitoring service engine 834 may execute one or more processes to collect, review, analyze, and store data related to a backup process of respective database (or other) service instances hosted by a hyperscaler. Embodiments are not limited to execution of these processes by a single computing device. Data storage device 830 may also store data and other program code for providing additional functionality and/or which are necessary for operation of server 800, such as device drivers, operating system files, etc. DBMS 836 may store and manage a variety of data types and structures, including, for example, consumption related data.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
a memory storing processor-executable program code; and
a processor to execute the processor-executable program code in order to cause the system to:
receive, by a statistics service, an indication of at least one metric related to a backup storage process provided by a cloud services infrastructure for each of a plurality of database service instances, the plurality of database service instances each being hosted by the cloud services infrastructure providing backup storage space for the plurality of database service instances, the statistics service being external to and distinct from the cloud services infrastructure;
determine, by the statistics service based on the received indication of the at least one metric related to a backup storage process provided by a cloud services infrastructure for each of the plurality database service instances, at least one value related to a backup storage process provided by a cloud services infrastructure for each of the plurality of database service instances;
store a record of the determined at least one value related to a backup storage process provided by a cloud services infrastructure for each of the plurality of database service instances in a persistent data storage device that is external to and distinct from the cloud services infrastructure hosting the database service instances and providing the backup storage process and the backup storage space for the plurality of database service instances;
receive, by the statistics service, a request from a third-party entity for one or more of the stored at least one value for at least one of the plurality of database service instances, the third-party entity being neither of the cloud services infrastructure hosting the database service instances nor the statics service, the request specifying a first value for each of the database service instances hosted by the cloud services infrastructure and a second value for the at least one database service instance of the request for which the first value exceeds a first threshold; and
transmit, in reply to the request from the third-party entity, the requested one or more of the at least one value for the database service instances specified in the request to the third-party entity.

2. The system of claim 1, wherein an application programming interface (API) of the statistics service external to and distinct from the cloud services infrastructure is used by the third-party entity in communicating the request from the third-party entity.

3. The system of claim 1, wherein the backup storage process associated with the at least one metric is at least one of a data backup process, a data backup recovery process, and combinations thereof.

4. The system of claim 1, wherein an application programming interface (API) of the cloud services infrastructure is used in making a request for the at least one metric related to a backup storage process for each of the plurality of database service instances.

5. The system of claim 1, wherein the third-party entity is at least one of an alert service that generates an alert, a compliance service that monitors compliance with a regulation, and a forecasting service that generates forecasts, each based on the at least one value for the database service instances specified in the request.

6. The system of claim 1, wherein the indication of the at least one metric is continuously received for each of the plurality of database service instances.

7. A computer-implemented method, the method comprising:
- receiving, by a statistics service, an indication of at least one metric related to a backup storage process provided by a cloud services infrastructure for each of a plurality of database service instances, the plurality of database service instances being hosted by the cloud services infrastructure providing backup storage space for the plurality of database service instances, the statistics service being external to and distinct from the cloud services infrastructure;
- determining, by the statistics service based on the received indication of the at least one metric related to a backup storage process provided by a cloud services infrastructure for each of the plurality database service instances, at least one value related to a backup storage process provided by a cloud services infrastructure for each of the plurality of database service instances;
- storing a record of the determined at least one value related to a backup storage process provided by a cloud services infrastructure for each of the plurality of database service instances in a persistent data storage device that is external to and distinct from the cloud services infrastructure hosting the database service instances and providing the backup storage process and the backup storage space for the plurality of database service instances;
- receiving, by the statistics service, a request from a third-party entity for one or more of the stored at least one value for at least one of the plurality of database service instances, the third-party entity being neither of the cloud services infrastructure hosting the database service instances nor the statics service, the request specifying a first value for each of the database service instances hosted by the cloud services infrastructure and a second value for the at least one database service instance of the request for which the first value exceeds a first threshold; and
- transmitting, in reply to the request from the third-party entity, the requested one or more of the at least one value for the database service instances specified in the request to the third-party entity.

8. The method of claim 7, wherein an application programming interface (API) of the statistics service external to and distinct from the cloud services infrastructure is used by the third-party entity in communicating the request from the third-party entity.

9. The method of claim 7, wherein the backup storage process associated with the at least one metric is at least one of a data backup process, a data backup recovery process, and combinations thereof.

10. The method of claim 7, wherein an application programming interface (API) of the cloud services infrastructure is used in making a request for the at least one metric related to a backup storage process for each of the plurality of database service instances.

11. The method of claim 7, wherein the third-party entity is at least one of an alert service that generates an alert, a compliance service that monitors compliance with a regulation, and a forecasting service that generates forecasts, each based on the at least one value for the database service instances specified in the request.

12. The method of claim 7, wherein the indication of the at least one metric is continuously received for each of the plurality of database service instances.

13. A non-transitory, computer readable medium storing instructions, which when executed by at least one processor cause a computer to perform a method comprising:
- receiving, by a statistics service, an indication of at least one metric related to a backup storage process provided by a cloud services infrastructure for each of a plurality of database service instances, the plurality of database service instances being hosted by the cloud services infrastructure providing backup storage space for the plurality of database service instances, the statistics service being external to and distinct from the cloud services infrastructure;
- determining, by the statistics service based on the received indication of the at least one metric related to a backup storage process provided by a cloud services infrastructure for each of the plurality database service instances, at least one value related to a backup storage process provided by a cloud services infrastructure for each of the plurality of database service instances;
- storing a record of the determined at least one value related to a backup storage process provided by a cloud services infrastructure for each of the plurality of database service instances in a persistent data storage device that is external to and distinct from the cloud services infrastructure hosting the database service instances and providing the backup storage process and the backup storage space for the plurality of database service instances;
- receiving, by the statistics service, a request from a third-party entity for one or more of the stored at least one value for at least one of the plurality of database service instances, the third-party entity being neither of the cloud services infrastructure hosting the database service instances nor the statics service, the request specifying a first value for each of the database service instances hosted by the cloud services infrastructure and a second value for the at least one database service instance of the request for which the first value exceeds a first threshold; and
- transmitting, in reply to the request from the third-party entity, the requested one or more of the at least one value for the database service instances specified in the request to the third-party entity.

14. The medium of claim 13, wherein an application programming interface (API) of the statistics service external to and distinct from the cloud services infrastructure is used by the third-party entity in communicating the request from the third-party entity.

15. The medium of claim 13, wherein the backup storage process associated with the at least one metric is at least one of a data backup process, a data backup recovery process, and combinations thereof.

16. The medium of claim 13, wherein an application programming interface (API) of the cloud services infrastructure is used in making a request for the at least one metric related to a backup storage process for each of the plurality of database service instances.

17. The medium of claim 13, wherein the indication of the at least one metric is continuously received for each of the plurality of database service instances.

* * * * *